Nov. 23, 1948.        H. P. HENDERSON ET AL        2,454,555
COMBINATION CAP AND PLUG
Filed Aug. 30, 1944
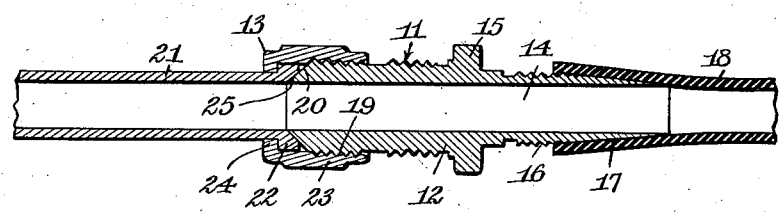
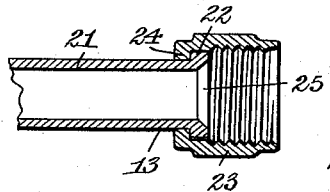 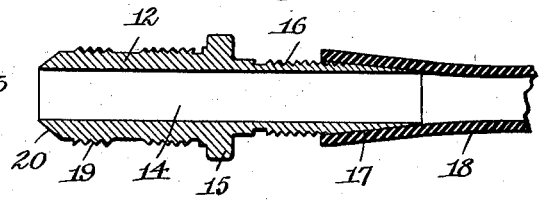
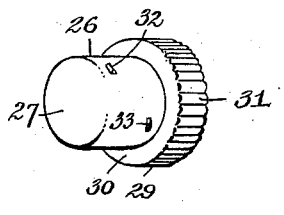 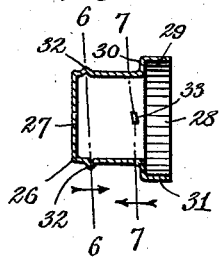 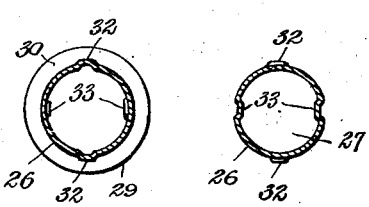 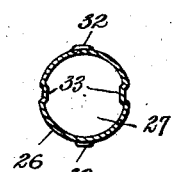
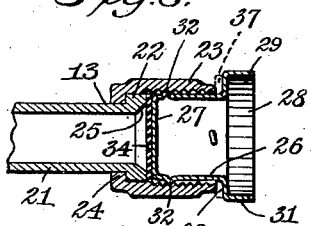 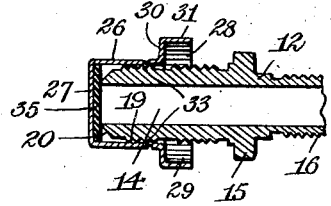
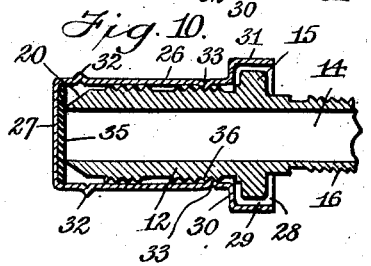
Harold P. Henderson
Philip Kaplan
Inventors
By Emil Neubart
Attorney.

Patented Nov. 23, 1948

2,454,555

UNITED STATES PATENT OFFICE 2,454,555

COMBINATION CAP AND PLUG

Harold P. Henderson and Philip Kaplan, Buffalo, N. Y., assignors to Clover Industries Inc., Buffalo, N. Y., a corporation of New York Application August 30, 1944, Serial No. 551,914

2 Claims. (Cl. 138—89)

This invention relates to a combination sealing cap and plug designed for use in the sealing of hydraulic lines, hydraulic cylinders, and generally in the closing of openings leading to hydraulic lines, hydraulic cylinders and other devices, elements, or apparatus through which liquids, usually under pressure, are passed or through which gaseous fluids are to be passed.

In airplane and automotive vehicles, among which latter may be included passenger automobiles, trucks, tanks, mobile turrets, and other land vehicles, hydraulic brakes are commonly used and the brake system employed is usually built up and the parts thereof assembled in quantities and stored for future shipment.

These brake systems include tubes or pipes, generally referred to as hydraulic lines, and it is highly desirable that the inlets to these lines or to the hydraulic cylinders used in the system be sealed preparatory to temporarily storing them until they are shipped where needed.

There are, of course, many other devices, elements, or apparatus in use having or which are associated with hydraulic lines, and whether temporarily stored for future shipment or shipped directly after completion, the inlets and outlets to these lines, under which term passages or chambers in cylinders or other parts may be included, are generally sealed to prevent entrance of dust, dirt, and other foreign matter, to thus safeguard the cylinders and their co-acting pistons or other relatively movable parts from becoming damaged when placed in operation.

Closures for this purpose are now in use, but so far as known to us, no sheet-metal combination cap and plug has heretofore been used as a closure and such caps or plugs as have been used, were constructed of material easily broken.

Various kinds of devices, elements, or apparatus into or through which liquid under pressure or gaseous fluids are passed have either internally screw-threaded inlets or externally screw-threaded outlets to be closed, respectively, by a plug or cap.

It is the prime object of our invention to provide a combination cap and plug formed of metal and preferably designed for internally screw-threaded inlets or outlets, or for inlets or outlets in parts which are externally screw-threaded.

Another object of our invention to provide a closure which will serve as a plug for an internally screw-threaded inlet of a given diameter or as a cap for an externally screw-threaded part having an inlet or outlet of like diameter or of a diameter slightly larger.

A further object of our invention is to provide a closure of the type mentioned which is highly efficient, simple, and cheap to produce and which will enable the number of dies required to produce caps and plugs for all sizes of inlets and outlets to be greatly minimized.

Devices, elements, or apparatus having hydraulic ducts or hydraulic lines connected thereto are often stored in large quantities by the manufacturer of the same and while storing, it is necessary to keep the lines or ducts free of dust, dirt, and other foreign matter so that when shipped to distant points for assembly with other parts to constitute a complete apparatus, vehicle, or structure, they will be delivered to the place of assembly in perfect condition. As sometimes occurs, assembling of parts takes place under conditions that would cause considerable dust, dirt, or grit to enter the lines or ducts if kept open and particularly when servicing airplanes, trucks, tanks, or the like. Under war conditions such servicing often takes place in deserts where sand storms occur or in places where snow storms are likely to take place, and under such conditions the inlets or outlets of the lines or ducts may be kept in closed condition until actual connection of the same is made with other parts to be joined in the assembly.

Our invention is also of decided advantage for covering the openings of water or steam pipes and fittings used in connection therewith and in fact may be used for anything having on opening and screw-threads associated therewith and from which dust, dirt, grit or other foreign particles are to be excluded.

The invention is particularly of advantage for use when shipping hydraulic cylinders and other like objects wherein oil and other liquid material must be retained from the time of its completion to the time of installation for use.

In the accompanying drawings:

Fig. 1 is a longitudinal section through a pipe fitting of a type having a hose or other flexible tube attached to one end thereof; the fitting being adapted to be separated so that each part has an open end to which a closure of some kind is to be applied.

Fig. 2 is a longitudinal section through one of the parts of the fitting shown in Fig. 1, said part being hereinafter referred to as the female part.

Fig. 3 is a longitudinal section through the other part of the fitting shown in Fig. 1, which we prefer to refer to as the male part.

Fig. 4 is a perspective view of our combination cap and plug, the same being viewed from the closed end thereof.

Fig. 5 is a longitudinal section of our combination cap and plug.

Fig. 6 is a cross-section, taken on line 6—6, Fig. 5.

Fig. 7 is a cross-section, taken on line 7—7, Fig. 5.

Fig. 8 is a longitudinal section through the female part of the fitting closed by our combination plug and cap, used as a plug.

Fig. 9 is a longitudinal section of the male part of the fitting closed by our combination cap or plug, used as a cap.

Fig. 10 is a longitudinal section of the male part of the fitting having a modified form of our combination cap and plug closing the same, as a cap.

While we have shown a fitting of a particular type serving as part of a hydraulic line, the application of our combination cap and plug is merely representative, serving to illustrate the manner in which an inlet or an outlet may be closed when such inlet or outlet is provided with either internal or external screw-threads, and it will be apparent that any opening, whether in a hydraulic line connected with a source of supply for the liquid or fluid passing therethrough and the part to which it is to be led, or otherwise, may be closed in the manner illustrated in the drawings.

The pipe fitting designated by the numeral 11 in Fig. 1 is of a common type and is used in a representative manner because of the large number of these fittings being employed in airplanes, automobiles, and other vehicles, and in hydraulic brakes and other parts used in airplanes and vehicles of various types. The fitting shown comprises a male part 12 and a female part 13.

The male part 12 has a passage 14 extending entirely therethrough forming an opening at its outer end and a medially enlarged portion 15 with the usual flat sides to enable a wrench to be applied thereto. At one side of the enlarged portion 15, part 12 is screw-threaded, as at 16, and tapered from the threaded portion to its outer end, as at 17. Onto this tapered portion a hose or other flexible tube 18 may be forced and, if desired, in cases where pressure is employed to a degree that will not assure retention of the hose on the tapered portion, a clamping part (not shown) may be threaded onto the threaded portion 16 and be so constructed that it will firmly clamp the hose or flexible tube on part 12. As such a clamping element is commonly used where high pressure is employed, we have not found it necessary to illustrate the same. At the other side of the medially enlarged portion 15, part 12 is provided with external screw-threads 19 and its outer end is beveled, as at 20. 12 may also designate any externally-threaded tube or pipe as, for instance, shown in Figs. 11 and 12.

Part 13 comprises a tube 21, having a passage 21ª therethrough forming an opening at its outer end and having at its outer end a flange or collar 22, and slidably fitting on this tube is a connector-sleeve 23, internally screw-threaded to engage the screw-threads 19 on part 12. The inner end of said sleeve has an inwardly-directed flange 24 designed to engage the collar 22 and the end of the tube 21 is provided with a countersunk seat 25 against which the beveled end of part 12 is to fit and be retained by the internally threaded connector-sleeve 23, thus making a tight connection between the two parts.

Fittings or connectors of the type just described are commonly used in oil or other fluid-conducting lines and when the two parts thereof are separated, openings are provided leading to and/or from conduits, passages, or chambers in which fluid is to be retained or through which fluid is to be passed and it is highly essential, in many devices, to guard against the admission of dust, dirt, or other foreign matter to such conduits, passages, or chambers. For this purpose, we have designed a closure in the form of a combination cap and plug adapted for connection with external or internal screw-threads on the parts in which the openings are formed. We have, therefore, provided an element or shell 26, which is cylindrical and stamped of sheet metal, preferably comparatively thin aluminum, and which is capable of serving as a cap or a plug. It is stamped into cup-like form to provide a closed end 27 and an open end 28. It is diametrically or transversely enlarged at its open end, as at 29, to form a shoulder 30 and a gripping portion 31 easily accessible and serrated to enable the closure so formed to be conveniently applied in or over an opening by merely grasping the gripping portion between the thumb and index finger of one hand and forcing the closure into an opening or onto a part having an opening therein; preferably in the form illustrated, by rotative movement of the closure.

The peripheral wall of the closure or shell is provided at approximately diametrically opposite points with outwardly extending or external nubs 32, the nub at one side of the closure being convolutely-disposed with reference to the nub at the other side thereof. These outwardly projecting nubs are arranged preferably in close proximity to the closed end of the shell and similar inwardly extending or internal nubs 33 are formed on the peripheral wall of the shell near its outer end and these are also convolutely-disposed relatively.

In its preferred form, this closure is used in connection with screw-threads formed on parts to which it is to be applied and, therefore, by the term convolutely, we have reference to the convolutions of the screw-threads formed on or in such parts.

While we consider two substantially diametrically-opposite nubs to serve best for connection with screw-threads in or on parts to be closed by our improved closure, it is to be understood that more than two such nubs may be arranged around the circumference of the closure, either internally or externally, or both internally and externally, and since we prefer that these nubs, or projections as they may be termed, be slightly elongated and transversely shaped to substantially conform to the grooves in the convolutions of the screw-thread in conjunction with which they are to be used, a single nub or projection, will suffice for some purposes, particularly since the nub trends at a slight angle to a plane extending truly at a right angle to the axis of the closure and thus corresponds in trend to the trend of the screw-threads in or on which the closure is to be used. Such disposition is preferably applied to all nubs or projections, particularly when slightly elongated transversely.

As illustrated in Fig. 8 the closure is used as a plug and the outwardly extending or external nubs 32 thereof engage the screw-threads in the internally screw-threaded connector-sleeve 23 of the fitting or connector, and in order to positively seal the opening in the tube 21, to which said sleeve is loosely applied, a packing disk 34 of suitable material is inserted in said sleeve, against which the outer end of said tube bears. Upon rotating the closure after engaging the external nubs thereof with the screw-threads in the sleeve 23, said closure is forced tightly against the packing disk and at the same time draws the sleeve 23 outwardly to bring the inwardly-directed flange 24 of the latter firmly against the collar 21 of the tube. In this manner the parts of the fitting to which the closure is applied as a plug are held rigidly together, while the closure or plug is tightened to prevent the admission of water, dust, dirt, or any other foreign matter into the tube.

In Fig. 9 we have shown the closure used in the form of a cap. While these closures are necessarily made in different sizes, it will be apparent that two closures of exactly the same dimensions, may be employed for closing the male and female parts of such a fitting as shown and described. When applying the closure to the male part 12 of the fitting, a packing disk 35 is inserted into the closure so as to lie against the closed end thereof and the internal nubs engage the outer screw threads of said part. Thus upon rotating the closure, after having engaged said nubs with the external screw-threads of the part 12, the closure rides along the externally screw-threaded portion of said male part until the disk 35 engages the outer end thereof. Thus a tight seal against the admission of water, dust, dirt, or other foreign matter is provided when the closure is tightened upon said part.

There are instances when a closure of the type described is to be threaded onto a second section of screw-threads, as for instance illustrated at 36 in Fig. 10. In such cases, the cup-shaped closure is increased in length; but in other respects, it is employed in the same manner as shown in Fig. 9, except that the enlarged outer open end encircles the medially enlarged portion 15, to which a wrench or tool is to be applied for tightening the two parts of the fitting or connector together.

There may be instances where the seal or packing would be used to best advantage between the outer end of an internally-threaded element and the shoulder 30 of the closure, as illustrated by dotted lines 37 in Fig. 8. It will be apparent, therefore, that our improved closure is adapted for use in sealing openings of any kind, and especially such as have internal screw-threads or external screw threads around the walls of such openings and that the parts in which the openings are formed, would naturally vary in construction and be designed for various uses.

Having thus described our invention what we claim is.

1. A closure constructed of sheet metal formed into a cylindrical shell closed at one end and open at its other end and being diametrically-enlarged at its open end to internally enlarge the shell and provide a gripping flange and a shoulder connecting the parts of the shell of different diametrical dimensions, said shell having external means to engage and lock the same in an opening, and a gasket bearing against said shoulder and adapted to engage an object having an opening therein so as to seal the opening when said shell is locked therein.

2. In combination with a tube having a collar at one end and an internally screw-threaded sleeve surrounding the end of said tube and having a stop part engaging said collar, a closure for closing the end of said tube constructed of sheet metal formed into a cylindrical shell having one end closed and its other end open and having its open end diametrically-enlarged to form a gripping portion, said shell having an external projection adapted to engage the screw-threads of said sleeve, and a disk between the end of said tube and the closed end of said shell clamped therebetween upon tightening said shell into said sleeve.

HAROLD P. HENDERSON.
PHILIP KAPLAN.

REFERENCES CITED

The following references are of record in the file of this patent:

UNITED STATES PATENTS

| Number | Name | Date |
|---|---|---|
| 628,408 | Loper | July 4, 1899 |
| 1,590,517 | Jacobs | June 29, 1926 |
| 2,055,646 | Bosley | Sept. 29, 1936 |
| 2,082,144 | Bowers | June 1, 1937 |
| 2,134,730 | Osborn | Nov. 1, 1938 |
| 2,334,424 | Livermont | Nov. 16, 1943 |

FOREIGN PATENTS

| Number | Country | Date |
|---|---|---|
| 376,004 | Great Britain | July 7, 1932 |
| 572,488 | Germany | Mar. 17, 1933 |